United States Patent [19]

Butler et al.

[11] Patent Number: 4,922,516
[45] Date of Patent: May 1, 1990

[54] TELEPHONE TECHNICIAN'S TERMINALS WITH AUTO-SELECTION OF DIAL PULSE ON DTMF SIGNALLING

[75] Inventors: Myron C. Butler, Edmond, Okla.; Christopher Madore, Cypress, Calif.

[73] Assignee: Communications Technology Corporation, Los Angeles, Calif.

[21] Appl. No.: 360,469

[22] Filed: Jun. 2, 1989

Related U.S. Application Data

[63] Continuation-in-part of Ser. No. 148,427, Jan. 25, 1988, Pat. No. 4,837,811.

[51] Int. Cl.$^5$ .................... H04M 1/24; H04M 3/30
[52] U.S. Cl. ................................. 379/21; 379/27; 379/96
[58] Field of Search ............... 379/96, 21, 31, 23, 379/27

[56] References Cited

U.S. PATENT DOCUMENTS 3,778,556  12/1973  Mees et al. ........................ 379/23
4,194,098  3/1980  Carlson .............................. 379/21

Primary Examiner—Stafford D. Schreyer
Attorney, Agent, or Firm—Laney, Dougherty, Hessin & Beavers

[57] ABSTRACT

An improved craft technician's field terminal of the portable, hand-held type for use in communicating in diverse modes with a central technician access network. The terminal is connected to the telephone line in conventional manner in communication with the telephone access network; however, the terminal includes a SMART DIAL program that determines the type of service of the seized subscriber line thereby to facilitate out-dialing from the terminal. Job data can then be transmitted from the central network and downloaded to the terminal for instantaneous display. Re-transmission can be requested if needed. The terminal is capable of uploading data from the terminal display in either DTMF and/or ASCII to the central network. The craft technician's terminal contains a much greater storage capacity than any similar devices heretofore and it is capable of holding job order and response data for what amounts to greater than a full days technician work. In addition, data displayed at the terminal may readily be transmitted for printer access while still being retained in the terminal storage.

11 Claims, 8 Drawing Sheets

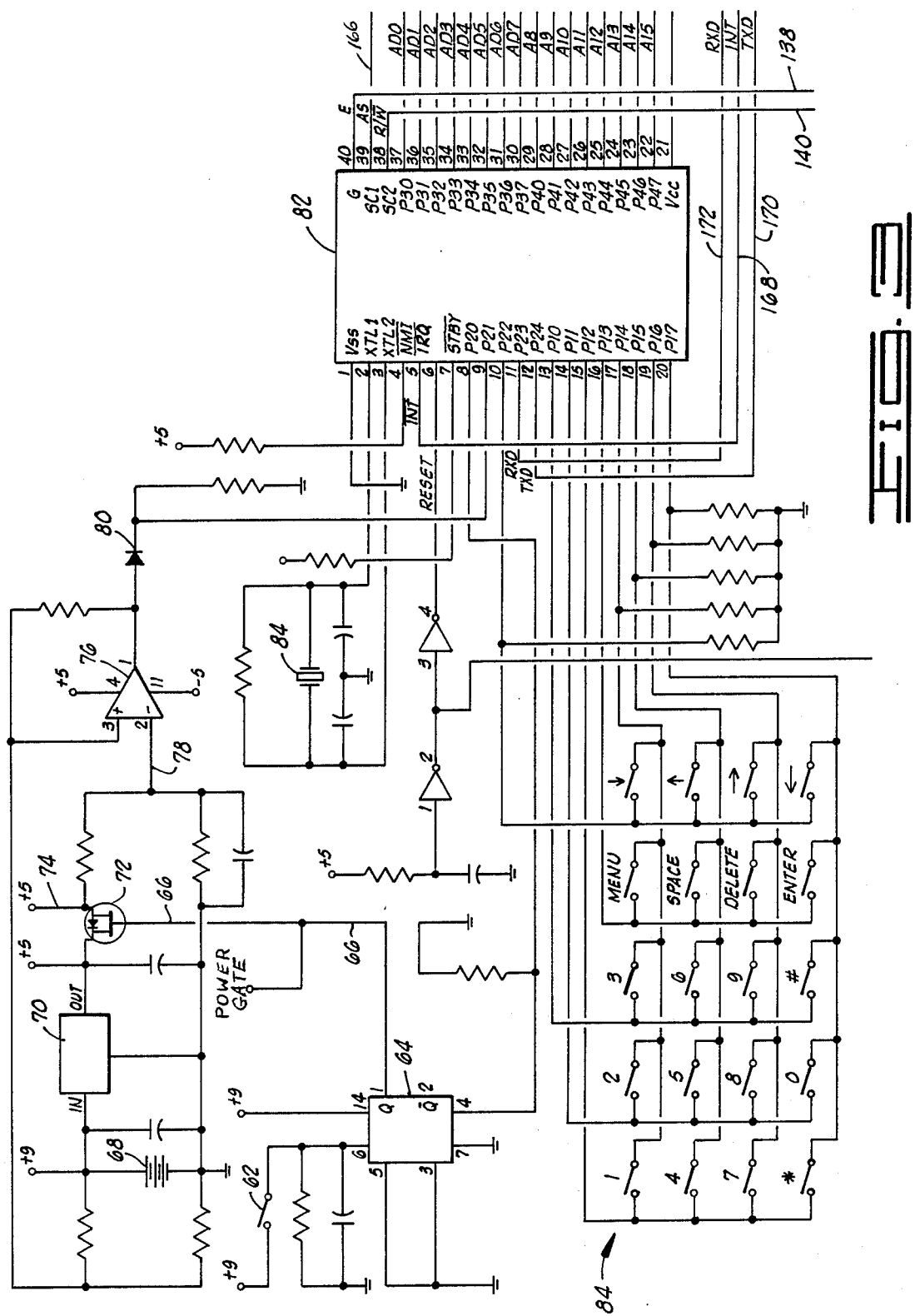

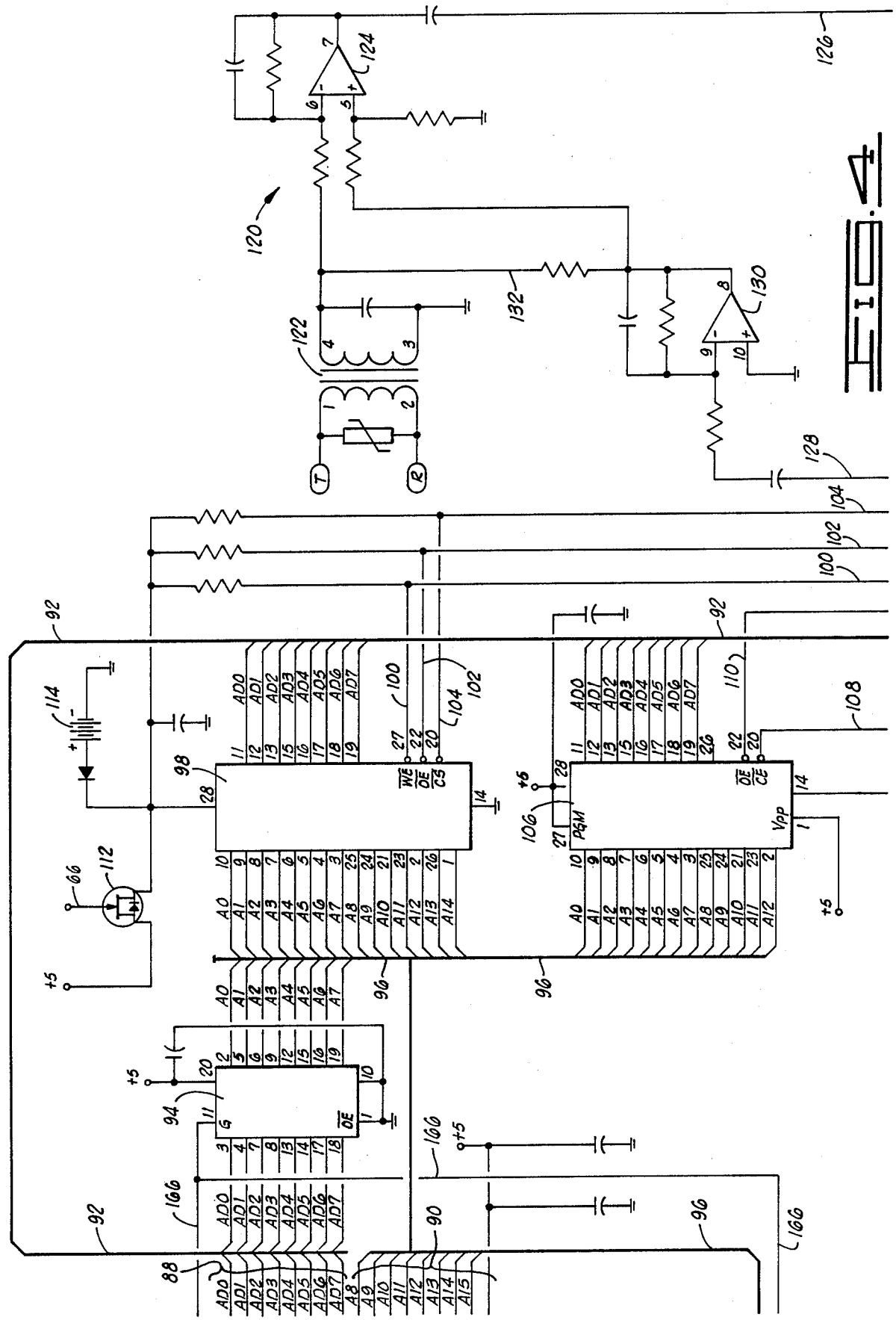

TELEPHONE TECHNICIAN'S TERMINALS WITH AUTO-SELECTION OF DIAL PULSE ON DTMF SIGNALLING

CROSS-REFERENCE TO RELATED APPLICATION

This application is a continuation-in-part of U.S. Application Ser. No. 148,427, filed 1/25/88 U.S. Pat. No. 4,837,811, entitled IMPROVEMENTS IN TELEPHONE TECHNICIAN'S TERMINALS.

BACKGROUND OF THE INVENTION

1. Field of the Invention

The present invention relates to telephone equipment for technician's employ to communicate with a central maintenance office and, more particularly, but not by way of limitation, it relates to an improved form of craft terminal transmitter and receiver having increased capability as to data handling and storage capabilities.

2. Prior Art

Heretofore telephone technicians have relied upon portable handsets that may be interruptively connected into a telephone line for communication with a central office. This type of communication device has evolved into what today is referred to as a butt set or lineman's test set, a standard and much used technician's tool. Newer telephone maintenance systems now function with a central maintenance computer network with which field technicians at various locations can communicate and exchange certain information relative to repair, maintenance and the testing of individual telephone subscriber lines. Technician terminals have evolved for communication in operating systems that are capable of additional communication functions of more sophisticated nature. U.S. Pat. No. 4,691,336 represents one such improved communication equipment. This unit consists of a connector coupling for connecting the set to the telephone line to communicate with a central maintenance computer, and it also includes a selectively energizable amplifier for amplifying signals occurring on the telephone line and a speaker for audibly communicating the message to the technician. This enables the technician to have hands free for transcribing dispatch and test information.

Still other improved technician communication systems expand the functional capabilities of such devices. One such device teaches an internal modem coupled with a predetermined amount of random access memory and a battery powered amplifier and loud speaker. This unit also has the capability of operating with a companion printer that may be truck mounted in the technician's vehicle. Still other devices operating at higher levels of information exchange may include some form of display screen mounted in the hand-held terminal and a limited ASCII keyboard for sending alphanumeric data. These types of devices require a truck-mounted companion printer to produce hardcopy.

SUMMARY OF THE INVENTION

The present invention is a telephone craft technician terminal that is capable of handling voice and/or data communication with any of several centralized technician access systems, and the terminal is also capable of displaying data to the craft technician. The terminal can be connected to the telephone line of the public switched telephone network in conventional manner, and through signaling of the required directory number it is placed in communication with the technician access system. A request for work data can then be made from the technician access system and data is downloaded instantly for representation on the terminal display. Re-transmission can be easily requested if needed. The terminal is then capable of uploading data from the terminal display in either dual tone multi-frequency (DTMF) and/or ASCII code to the technician access system. The terminal contains a much greater storage capacity than any known devices for similar application, and since a typical job order requires from 600 to 1000 characters, the present terminal can easily hold a full days work for subsequent re-examination or reporting.

Therefore, it is an object of the present invention to provide a telephone craft technician terminal that is compact, rugged and capable of multiple communication functions for interconnection with a variety of centralized access systems.

It is a further object of the present invention to provide such a terminal having multiple communication capabilities that is a pocket-sized, hand-held unit while still being relatively inexpensive to construct.

It is yet another object of the present invention to provide a technician's terminal that has the capabilities for receiving and transmitting data via interconnection to the central processor while also having readout, repeat and message construction capabilities.

Finally, it is an object of the invention to provide a telephone craft technician's terminal that may be used with any of several access levels of present technician access systems to provide complete data exchange via the public switched telephone network line interconnection.

Other objects and advantages of the present invention will become evident from the following detailed description when read in conjunction with the accompanying drawings.

BRIEF DESCRIPTION OF THE DRAWINGS

FIG. 3 is a schematic drawing illustrating the power control, matrix switching and central processing unit of the present invention;

FIG. 4 is a schematic drawing illustrating the storage network and data access circuitry of the present invention;

DETAILED DESCRIPTION OF THE INVENTION

In one present day form of telephone operating system having a central computer network, an access system has been included which is known as a technician access network (TAN) which provides for communication with craft technicians in the field. The system is capable of receiving calls from a craft technician via a dialed connection over the public switched telephone network. The TAN network provides protocol conversion from asynchronous to synchronous data that makes it possible for the technician to perform a number of field functions without the aid of a maintenance administrator. Thus, the craft technician is able to (1) process requests for new work; (2) process requests for circuit tests via mechanized loop test systems; and (3) to clear and close out completed work orders with the operating system central.

This particular TAN system provides for three levels of access, each level having a different telephone access number assigned to it. The access level will determine the type of peripheral hardware that is required in order to communicate with the various types of craft technician terminal equipment.

The TAN access Level 1 requires the least expensive and relatively simpler craft terminal equipment. It consists of an access peripheral that provides line supervision, detection of an incoming call, a register that will accept dial tone multifrequency (DTMF) signaling, a text-to-speech converter, and a synthesized speech output device to provide prompting and reporting to the craft technician. Level 1 requires that the craft technician terminal consists of at least a butt set equipped with some kind of amplifier/loud speaker device that will enable the speech output to be heard without the necessity for placing the handset to the ear after the DTMF commands have been transmitted to the TAN system.

Level 2 is a hybrid arrangement, e.g., it utilizes DTMF command signaling to gain access, to interrogate, and to enter data, but it can also respond in ASCII. The TAN peripherals for this level contain a DTMF register, a speech output device for prompting, and a 300/1200 baud modem for downloading any work orders and/or measurements.

Access Level 3 is data only. The TAN system is linked to a standard auto speed 300/1200 baud modem. All requests are transmitted in ASCII from a conventional data terminal, and the same log-on commands and six digit craft identifiers that are utilized in Levels 1 and 2 will be used to gain access and communicate in access Level 3.

Figure 1:
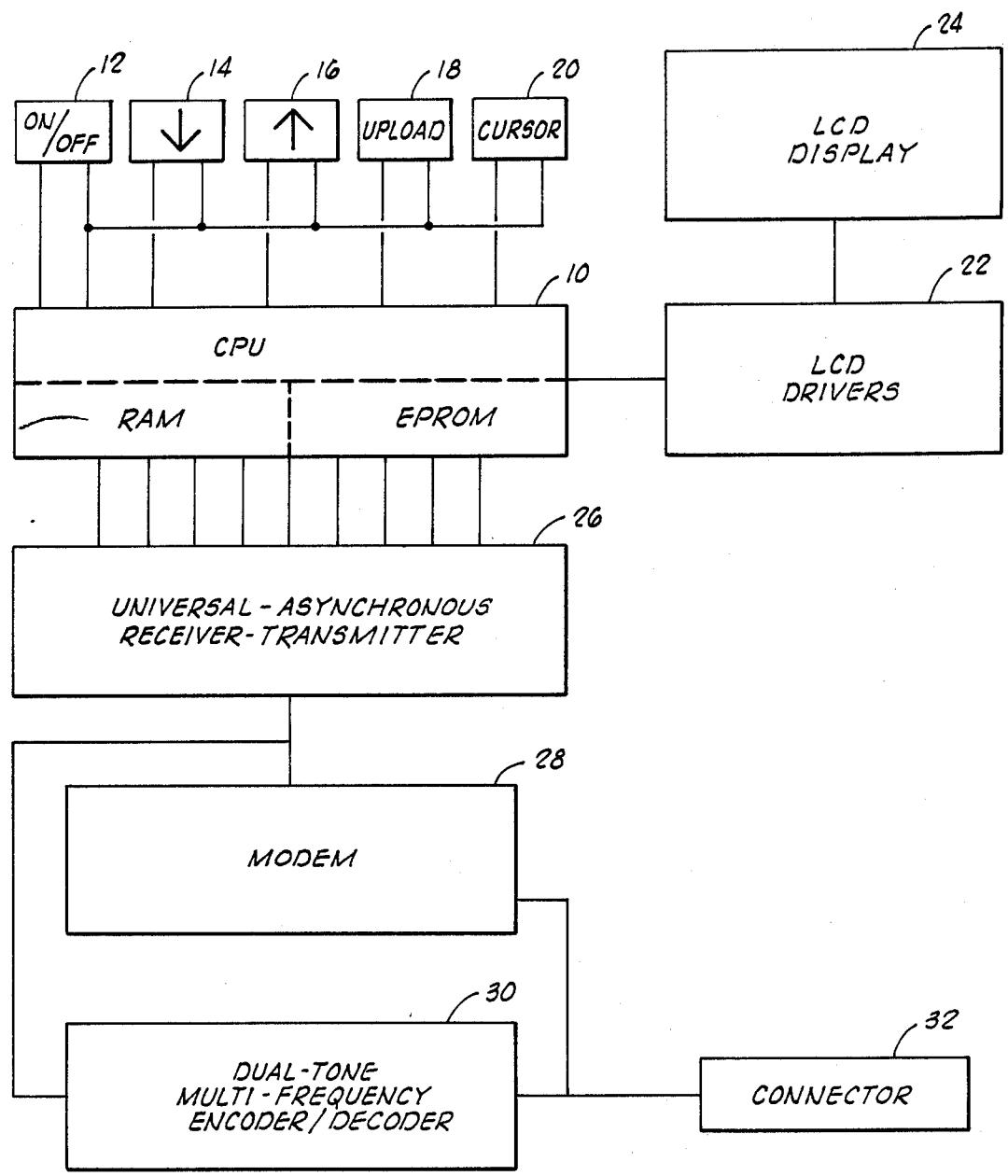
FIG. 1 is a functional block diagram of the present invention.

FIG. 1 illustrates a block diagram of the craft technician's terminal. The circuitry is miniaturized to greatest extent while still providing the requisite capabilities. A miniature computer 10 includes the necessary central processing unit, random access memory and erasable programmable read only memory, as will be further described below. Input control commands to the computer 10 are provided by the on/off control 12, down scroll of the display 14, upscroll of the display 16, edit cursor control 18 and data upload cursor control 20. The computer 10 is connected through a plurality of liquid crystal display drivers 22 to a suitable liquid crystal display 24. Preferably, the LCD display 24 will provide at least four lines of 20 alphanumeric characters, as will be further described.

Addressed data exchange takes place between computer 10 and a universal, asynchronous receiver-transmitter circuit 26 which is interconnected with both a modem 28 and a dual tone multifrequency encoder/decoder 30. The modem 28 and encoder/decoder 30 are both further connected in parallel to a connector 32 which functions to interconnect with a selected telephone system line, as will be further described below.

Figure 2A:
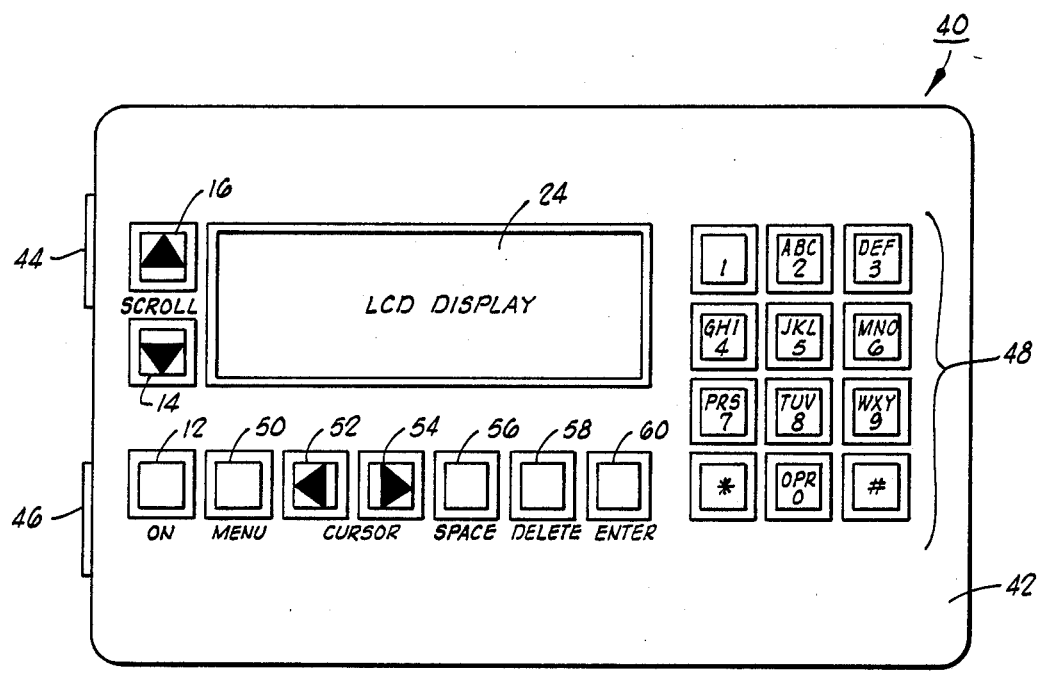
FIG. 2 is a front view of the craft terminal unit.
FIG. 2B is an end view of the craft terminal unit.
Figure 2B:
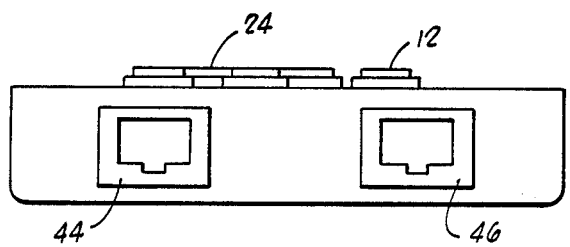

FIGS. 2A and 2B illustrate the terminal 40 as it appears in present design. The terminal 40 is enclosed in a rectangular case 42 which is pocket-sized and adapted for hand-held operation. A pair of RJ-11 connector plugs 44 and 46 are provided in an end panel to provide interconnection. The LCD 24 is placed generally centrally in the front panel of case 42 and a standard 16 button key pad 48 is disposed adjacent thereto. A series of individual control pressure pads are then provided for selected terminal operations. Thus, we have the upscroll button 16 and downscroll button 14 aligned on one side with the on/off button 12. Across the bottom beneath display 24 is a MENU select button 50, the cursor left and right buttons 52, 54, SPACE button 56, DELETE button 58 and ENTER button 60.

Figure 5:
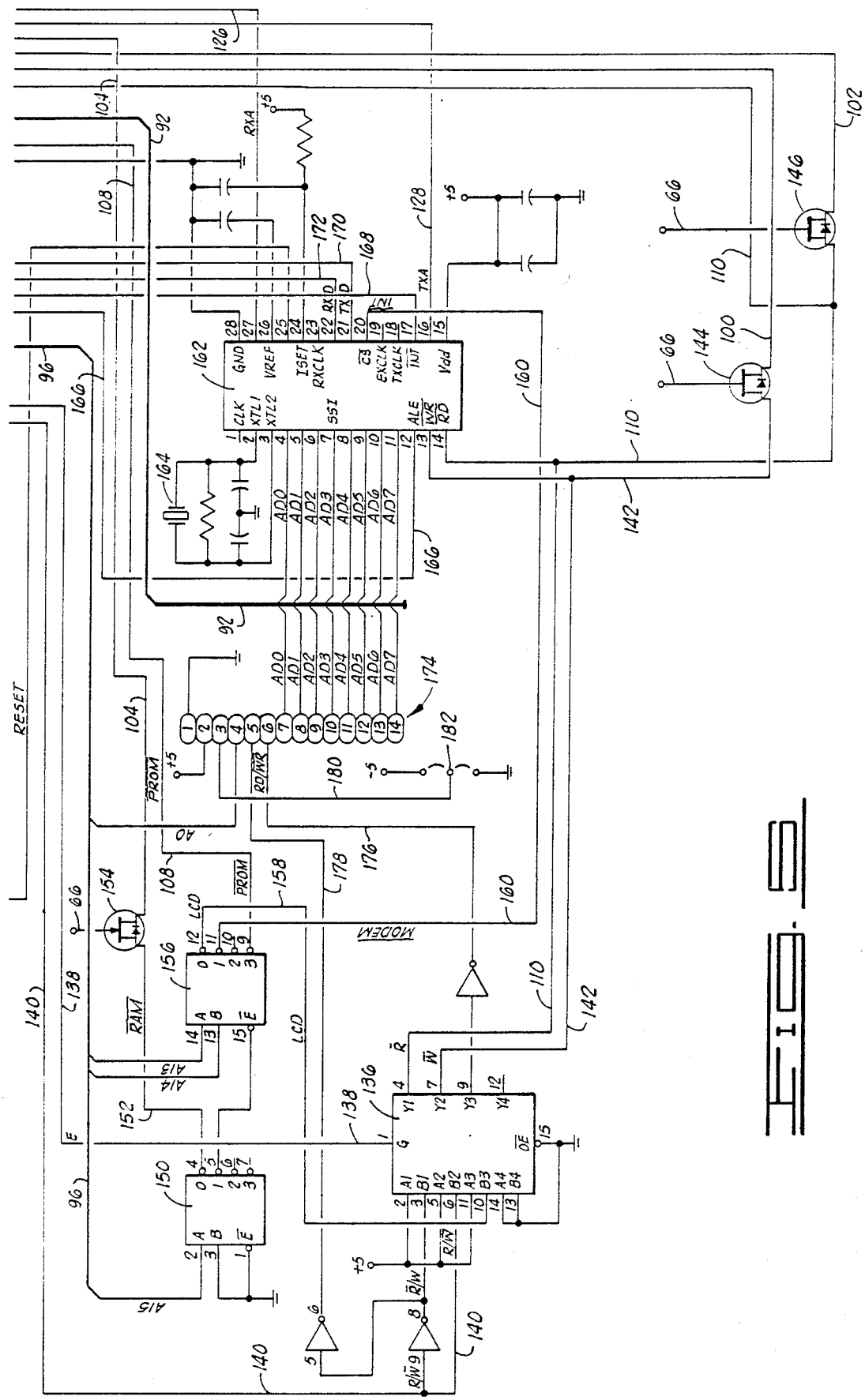
FIG. 5 is a schematic diagram illustrating the address decoding circuitry and the modem circuitry of the present invention.

FIGS. 3, 4 and 5 represent the schematic diagram for the circuitry of the present invention. Referring first to FIG. 3, there is included the power control, battery monitor, switch matrix circuitry and the microprocessor. Depression of button 12 actuates ON switch 62 to apply +9 volt supply to an IC type 4013 flip flop 64 which provides a power gate output at the Q output on lead 66. The power gate output on lead 66 is then applied around the circuitry as a turn-on signal to various FET transistors, as will be further described.

The main power battery 68, a 9 volt D-C source, is applied through an IC type MA78L05 voltage regulator 70 and output is controlled by a type 2N7000 field effect transistor (FET) 72 which has been turned on by application of power gate on lead 66. This allows output of the system energizing voltage of +5 volts D-C at lead 74.

A battery monitor circuit consisting of an IC type LM348 quad op-amp 76 continually monitors the regulated +5 volt D-C via reference voltage input 78, and diode 80 detects any undervoltage condition which is applied to port 21 of the microprocessor 82, a Hitachi IC type HD63A03 integrated circuit chip.

A crystal 84 oscillating at 4.9152 megahertz basic clock frequency is input to pins 2 and 3 of microprocessor 82. An interrupt signal as received from the modem (line 168), as will be described, is applied to pin 5 and a reset input is applied to pin 6. Port 20 (pin 8) of microprocessor 82 receives the Q output from the flip-flop 64.

A switch matrix 84 includes all of the keypad and function control switches as the matrix is connected for input between selected ones of microprocessor ports P22 and P10-P17. Finally, a receive data signal RXD is output from port 23 while a transmit data signal TXD outputs from port 24, and these are applied in control of the modem, as will be further described.

Referring again to microprocessor 82, pins 38, 39 and 40 provide control output of read/not write, address strobe and enable voltage for control of data demultiplexing and address decoding, as will be described. Ports P30-P37 provide 8 bit address plus data (time multiplexed) for output on 8 bit lead group 88, and ports 40-47 provide address output via 8 bit lead group 90.

Referring now to FIG. 4, the microprocessor address-data outputs AD0-AD7 are placed onto AD buss 92 which delivers data to various of the storage circuits of FIG. 4 as well as the modem circuit of FIG. 5, as will be described. AD0-7 is present at the input ports of AD multiplexer 94, an IC type 373 octal transparent latch, the output of which is placed on address leads A0-A7 on the A buss 96. A random access memory 98, a 32k×8 bit CMOS IC type HM62256LP-15, is connected to the AD buss 92 and 8 bit leads AD0-AD7 via pins 11 through 19 while the remaining opposite ports are connected to the address bit leads A0-A14 and A buss 96. Lead 100 provides write enable input, lead 102 provides output enable and lead 104 provides chip select input.

EPROM 106, an 8k×8 bit CMOS IC type 27C64, is connected in parallel with the random access memory 98. Thus, the ports 11-19 connect AD0-7 output leads to the AD buss 92 and the opposite side ports receive connection of the A0-A12 leads from the A buss 96. Chip enable input is provided on a lead 108 while output enable is received on lead 110. RAM control functions in response to application of the power gate voltage on lead 66 to a field effect transistor switch 112 as at controls development of signals on leads 100, 102 and 104. A 3.5 volt Lithium battery 114 is also connected to pin 28 of the random access memory 98 to function as keep-alive voltage in the event that the main battery 68 should lose power.

System access is provided by the circuitry indicated generally as 120 as tip (T) and ring (R) connection is made across a transformer 122 to provide signal input to an op-amp 124, a portion of a quad op-amp integrated circuit. The op-amp 124 functions to amplify incoming data signals from amplifier 122 as received at pin 6, and amplified output via lead 126 of any incoming received analog signal is applied to the modem circuitry, as will be described.

Transmitted time analog signal originating through the modem is present on a lead 128 for input to pin 9 of an op-amp 130, also type LM348, and amplified analog signal is present on output lead 132 so that the time analog signal is applied through transformer 122 and back through the tip and ring connections onto the telephone system lines for transmission to the central network.

We proceed now to FIG. 5 which includes the address decoding circuitry, the display circuitry and the modem. A data selector 136, an IC type HC257, quad two-line to one-line data selector, receives enable input via line 138 from the enable voltage pin output 40 of the microprocessor 82. The address strobe from pin 38 of microprocessor 82 is conducted via lead 140 for input to connections B2 and, after inversion, to connector B1 of the data selector 136. Read and write outputs from ports Y1 and Y2 on respective leads 110 and 142 are then directed towards control for output enable and write enable of RAM 98. Continuity of control lead 142 and lead 100 is completed upon application of power gate voltage on lead 66 to an FET transistor 144. Power gate voltage on FET transistor 146 enables continuity from lead 110 to the lead 102 and pin 22, the output enable of RAM 98. Read and write outputs on leads 110 and 142 are applied directly to the respective read and write ports of EPROM 162.

The A buss 96 distributes in the data selector circuitry as the A15 lead is connected to the A input of a decoder 150, an IC type HC139 dual two-line to four-line decoder. Output pin 4 provides a RAM chip select output on a lead 152 which finds continuity through power gate enabled FET transistor 154 to lead 104 and chip select pin 120 of RAM 98 (FIG. 4). Pin 5 output from decoder 150 is applied to the enable input pin 15 of a counterpart decoder 156 which also receives A13 and A14 inputs at ports A and B. Pin 12 output from decoder 156 then provides an enable signal for the liquid crystal display for input at port B3 of data selector 136. Pin 11 output is applied via lead 160 as a chip select signal to pin 20 of a modem 162. The modem 162 is a standard Silicon Systems, Inc. single chip modem type (Bell) 212 A/103. This is a standard modem that is configured to define the standard United States modem connection, and it should be understood that other modems might be selected in order to conform to a particular transmission standard, e.g., the European standard.

A crystal oscillator 164 operating at 11.0592 megahertz provides the basic clock frequency control for the modem 162 as pins 13 and 14 receive write and read signals from lines 110 and 142 from the data selector 136. The AD buss 92 delivers AD0-AD7 inputs to respective pins 4-11 and address strobe control at pin 12 (ADD latch enable) is supplied by a lead 166 from the pin 39 output of the microprocessor 82. A time analog transmission signal (TXA) is conducted from pin 16 via lead 128 for input to the output power amplifier, amp 130 (FIG. 4). Received analog signal (RXA) on lead 126 is applied at Modem pin 27. Interrupt control at pin 17 is present on a lead 168 as connected to pin 5 of microprocessor 82, the interrupt request port. Pin 21 of Modem 162 receives transmit data signal (TXD) on lead 170 from pin 12 of microprocessor 82, and pin 22 receives receive data signal (RXD) on a lead 172 from pin 11 of microprocessor 82.

The AD0-AD7 address data leads from AD buss 92 are also applied to the respective plug contact 7-14 of the 14 pin socket 174 which is adapted to receive a standard form of LCD driver/display integrated circuit. In a preferred form, there is utilized a VL Electronics, Inc. 20 character X 4 line dot matrix LCD module, type No. MDL-20464-LV. The LV designation relates to ambient operating temperature and this may vary with different applications. Inverted output from Y3 port of data selector 136 is applied as read/not write signal via lead 176 to pin 6 while socket pin 5 receives inverted not read/write signal on lead 178. Socket pin 4 receives A0 signal from A buss 96 and socket pin 3 receives a 5 volt signal on lead 180 from a −5 volt D-C/D-C converter (not shown) which is connected at junction point 182.

The terminal circuitry as set forth in FIGS. 3, 4 and 5 is adequate to carry out the requisite testing control functions to a varying degree of completion and resolution as regards the particular telephone test functions, data exchange, display, etc. A skilled computer programmer can readily write the requisite program for controlling the terminal circuitry of FIGS. 3, 4 and 5, and it is submitted that the particular software programs will vary within wide limits depending upon the individual programmers. One current form of software program that has proven operational is submitted with the present application as exhibitory material.

In operation, the craft technician's terminal 40 as employed with a selected level of the TAN system enables the telephone technician to carry out all repair job functions, with remote aid as required from the TAN system, while still having the capability for visual readout of downloaded information from TAN as well as the ability to upload data to TAN by either DTMF or ASCII transmission. In addition, the present terminal has sufficient storage capacity to store a number of different job related data passages, i.e., easily enough storage capacity to contain a normal full days work.

The terminal is connected to any subscriber telephone line. Standard RJ-11 connectors are used. The technician can then dial the directory number for the central computer, enter the log-on and required password to gain access to the technician's access system or network. After the log-on procedure the technician selects the type of transaction desired from a menu transmitted by the central computer. The terminal 40 receives download of data in ASCII code which is decoded and entered in RAM 98 while also being displayed on LCD 24. The modem 162 provides 300/1200 baud data handling in communication with serial asynchronous ASCII code transmission from the central TAN processor.

The RAM 98 has capacity to store up to 20 messages of 1,000 characters. All data received at terminal 40 will be stored in RAM 98 in the order in which it comes in, and when the allocated RAM storage is full, the oldest data will be flushed out. The EPROM 106 functions only to store the program instruction data for controlling operation of the microprocessor 82.

The LCD display 24 has a display area of at least four lines of twenty alphanumeric characters (four rows, twenty columns). Switch buttons 52, 54 (FIG. 2A) control line cursor indication which permits the user to edit one line of the four-line display at a time. If an error is made, the user can move the cursor along the left margin of the screen to the line requiring correction. Correction may then be made by typeover. Switch buttons 14 and 16 provide the capability for scrolling the display either up or down to review previous messages. Whenever terminal 40 is connected to a telephone line and receiving data, the incoming messages will be displayed serially on LCD 24.

The terminal provides a stop-scroll or scroll-back function that permits the user to stop the incoming data appearing on the screen, while the incoming data is being stored in memory. The terminal 40 can operate to download the contents of memory to a printer; but, primarily, it functions to retrieve data from the central processor by either DTMF or ASCII coded transmission. The terminal 40 has internal power supply and can perform off-line entry wherein the technician uses alphanumeric keypad 48 to construct a message as displayed on LCD 24. The technician can then connect the terminal 40 to the telephone subscriber line and, by depressing the ENTER button 60, the message is transmitted line by line via DTMF coded transmission to the central TAN.

There are a number of different codes for translating data via the standard keypad. In present programming, the terminal 40 uses DTMF and/or ASCII coding where numeric characters are sent direct single digit with alpha characters coded by a double digit indication. A double asterisk indication is used for shifting back and forth between alpha and numeric characters. The double digit alpha code, for example to send an "A", would depress the "2-ABC" key first to represent the grouping ABC, and the second digit "1" is depressed to indicate the "A". Thus, "B" would enter "2-2", "C" would enter "2-3", "D" - "3-1", etc.

Before undertaking operation of the present terminal, the operator must configure the terminal to operate with whatever the selected TAN system and/or access level, and this can be accomplished by answering questions that are prompted by the terminal. The operator will have a "USER'S GUIDE" which offers step-by-step instructions for readying the terminal for operation.

Discussed in order, set up procedure is as follows. Step 1, the operator is instructed to turn the terminal on by pressing the ON key 12 and, as presently programmed, this will produce an LCD multi-line readout stating "CMC VERSION 1.0 BATT OK-RAM OK PRESS ENTER OR MENU." The operator is then told to press the MENU key UP arrow scroll key twice and he receives the following multi-line result: "TERMINAL CONFIG. PRINT CLEAR MEMORY (SCROLL DOWN)"; and, thereafter the operator presses the ENTER key upon instruction and the LCD reads "UPLOAD TO HOST MODE=ASCII Y/N." To this point the terminal is acceptable for use at TAN Level 1.

If you are to use the TAN Level 2 access mode, the operator is then instructed to press the DELETE key and then the ENTER key and this will program your terminal to receive messages in ASCII and to transmitt in DTMF (touch-tone) to the TAN system. The result readable on the LCD is "SPEED EQUAL 1200 Y/N". Thereafter, if 1200 baud is the correct speed, the operator can then press ENTER and the LCD will read "EOL=CR Y/N"; or, if 1200 baud is not correct, the operator can press the DELETE key once whereupon the "SPEED=300 Y/N" will appear which, if correct, press ENTER and the LCD will read out the correct "EOL=CR Y/N".

Next, if the EOL (end of line) sequence is correct, the operator can press ENTER and the result reading out on the LCD is "CMC VERSION 1.0 BATT OK-RAM OK PRESS ENTER OR MENU". In the event that "CR" is not the correct EOL sequence, the operator can press the DELETE key and this will cause the terminal to display the following options: "EOL=CR/LF Y/N", "EOL=LF Y/N" or "EOL =NONE". When the correct EOL sequence has been displayed, press ENTER and the result will appear on the LCD display reading "CMC VERSION 1.0 BATT OK-RAM OK PRESS ENTER OR MENU". When this screen message appears, all settings will be saved for the use of the operator when communicating with the TAN system.

In order to effect downloading of data from the TAN system to the craft technician's terminal, the procedure is as follows. The operator first connects the terminal 40 to the telephone subscriber line. The craft technician terminal 40 is connected by means of an RJ-11 plug/cord set, and the operator dials the directory number for access to the technician access network. When TAN answers, the operator then enters the log-on digits and the password digits by means of the DTMF keypad 48. The operator then requests download from the TAN system by entering the appropriate command sequence.

The downloaded message will appear on the LCD 24 while also being retained in terminal memory. Thus, for example, a readout multi-line message may appear as "555-1212/no dial tone/1234 Country Lane/Trent, Robert", and this message in effect gives the operator his job order by telephone number, failure complaint and address of telephone customer. It may be noted here that the LCD display 24 will automatically turn off after 180 seconds of no activity; however, to recall the message previously placed on the LCD display 24, the operator need only press ON and the enter (arrow) key to bring back the same message. It may be noted that the last message received will always appear on the display. To view other messages, the operator may press the scroll UP arrow button until the desired message is in the viewing screen. Each time the scroll UP arrow button is pressed, the display will advance one line. Holding the scroll key down will cause the display to autoscroll from line-to-line.

When operating in TAN access in any level, the operator also has the capability of uploading data from the handheld terminal back to the TAN system central. Any messages that the operator wishes to upload in the TAN system can be prepared on the handheld terminal prior to calling the TAN access number. This procedure is referred to as "off-line editing". In order to prepare a message for transmission to the TAN system, the operator can press the ON key and then follow with pressing the MENU key with a resulting LCD readout "OFF LINE EDIT DIRECTORY TERMINAL CONFIG. (SCROLL UP)". If the operator now presses ENTER the terminal scrolls to a blank page above the operators last message and he can then enter the message from the DTMF keypad at the right of the display screen. The operator may enter the first line of the message and then press ENTER which functions to save the line just entered and scrolls the text down one line whereupon the cursor will be at the left top margin and ready to accept the second line of text.

With the terminal connected to a subscriber telephone line, the operator next dials the TAN access number and, after log-on and ID procedures are complete, the DTMF command sequence can be entered to prepare the TAN system for reception of the message. Then, when voice prompt is received, the operator presses ENTER to effect transmission. The top line of the display will be transmitted in DTMF using the TAN format and the line of text transmitted will scroll up automatically bringing the second line of text to the top line of the display and ready for transmission. Pressing of ENTER will commence sending of the second line of text, etc. That is, procedure is repeated for each line until the entire message is transmitted to TAN. The terminal can be disconnected from the telephone service line when the transaction is completed and the technician's terminal will shut off automatically.

Figure 6A:
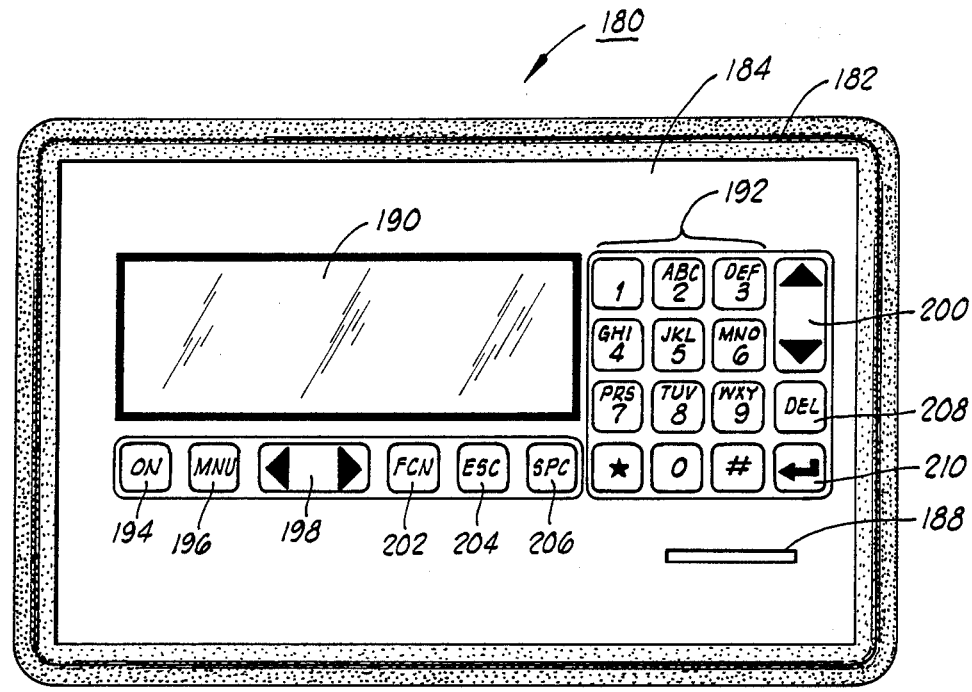
FIG. 6A is a front view of an improved version of craft terminal unit.
Figure 6B:
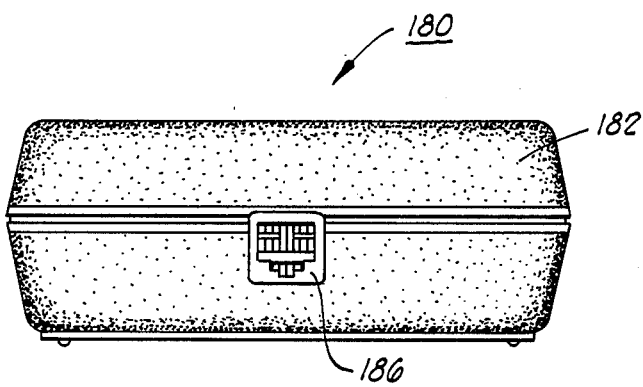
FIG. 6B is an end view of the improved craft terminal unit.

FIGS. 6A and 6B illustrate an improved terminal unit 180 that has several additional features not available in terminal 40. The terminal 180 is an improved type of hand-held, battery-powered, microprocessor-controlled data terminal that includes a more versatile keyboard offering a greater number of operational functions while also having "smart dial" capability for automatically determining types of subscriber lines encountered at the various customer locations. In addition, the terminal 180 includes a line-powered amplifier/speaker which enables monitoring of a subscriber line or the progress of any call dialed with the terminal, and the speaker output provides hands-free audible monitoring of synthesized speech prompts or recorded messages.

The terminal 180 is enclosed in shock-mounting within a rectangular case 182 having a flat front face 184. External connection is made via a standard RJ-11C connector 186 located in one side wall of the case 182. A narrow slot 188 is formed in front face 182 to provide audio output from the internal speaker and a rectangular LCD display 190 provides at least four lines of 20 alphanumeric characters per presentation.

The front panel controls include a standard 12-button alphanumeric key pad 192 as well as a number of special function buttons. ON button 194 turns the power on-off while button MNU 196 functions to select the menu for display on liquid crystal display 190. Button 198 moves the display cursor left or right and button 200 provides for up/down display control. FCN button 202 enables special commands while ESC button 204 controls exit from a routine. The SPC button 206 allows the operator to add space to text, DEL button 208 functions to delete character and to signify "no", and the arrow button 210 serves to indicate end of line and to signify "yes".

Figure 7:
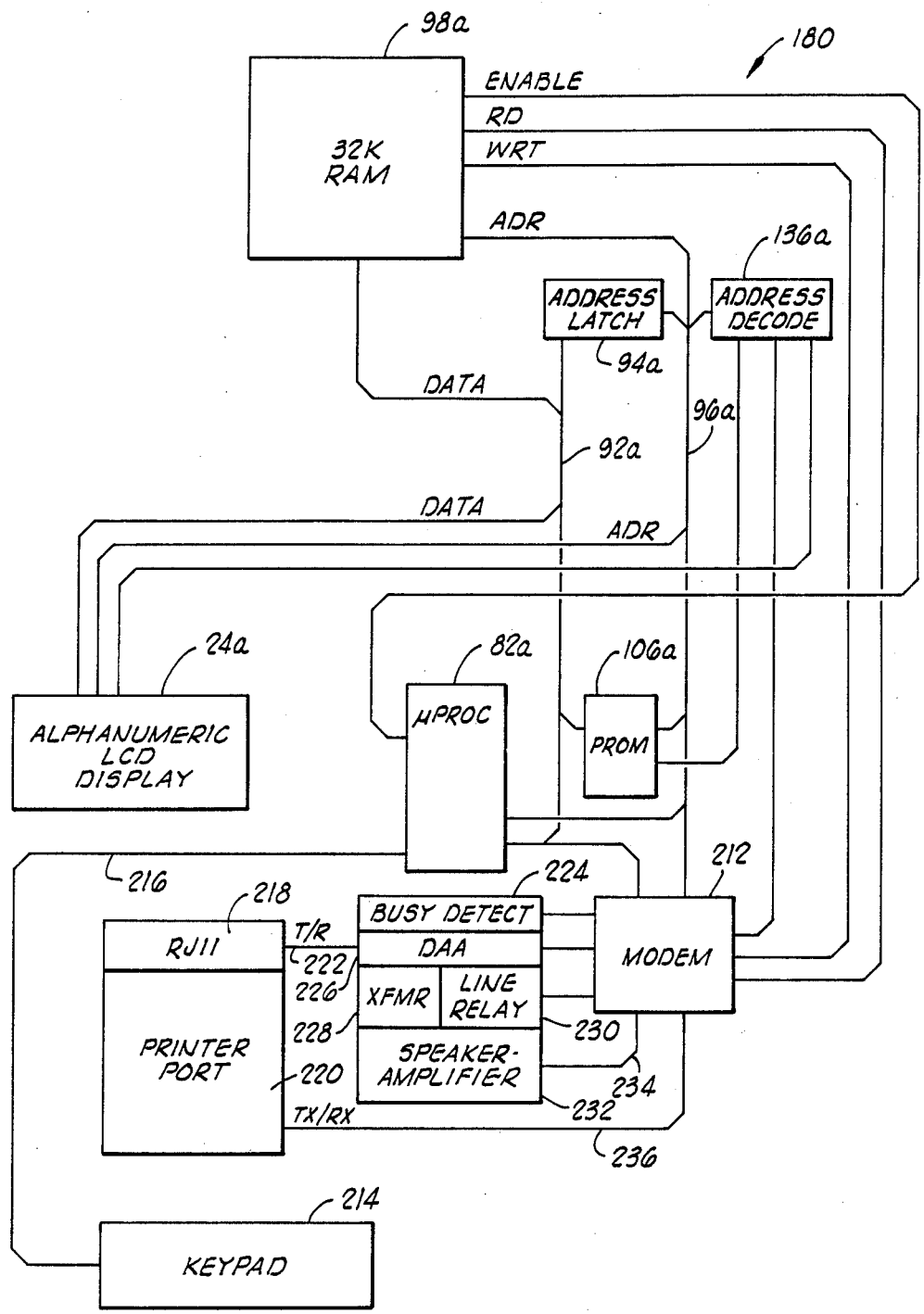
FIG. 7 is a block diagram of the improved craft terminal unit.

FIG. 7 is a block diagram of the improved type of terminal 180. Many of the components remain the same as in the terminal 40 (FIG. 1) and these components will be identified by the same numeral. Thus, the microprocessor 82a remains the same type as in FIG. 3 relating to terminal 40. Microprocessor 82a functions with an erasable programmable read only memory 106a and a 32k random access memory 98a. The alphanumeric LCD display 24a is connected in the same manner as are the address decoder 136a and address latch 94a.

A primary change is the use of a different modem 212, an integrated circuit type 73K222U (Hitachi), which affords increased interfacing connection to enable the additional functions now utilized in the terminal 180. The keypad 214, i.e., keys 192 and special keys 194–210, as shown in FIG. 6A, then provide selective inputs to the microprocessor 82a via input line 216.

The terminal 180 is connected at the subscriber station through a standard RJ-11 plug 218. In this case, there is utilized a type RJ11(c) plug having six pins so that it may accommodate either a standard RJ11 telephone connector or a larger six pin connector that may also provide interconnection to a printer port 220. Use of the standard six pin RJ connector will suffice for all data transfer. Telephone tip and ring from the subscriber line are connected via line pair 222 to terminal 180 and the standard busy detect circuitry 224 and dial access arrangement 226. Busy detect 224 senses the rectified tip/ring voltage with a voltage comparator circuit and provides a set voltage to modem 212 indicating that the seized line is busy. The dial access arrangement 226 consists of an isolation transformer 228 connected in the tip/ring line and serving to protect against any circuit failure in the terminal affecting the subscriber line. A line relay 230 is controlled in response to the "hook" condition of terminal 180.

Modem 212 receives control inputs from busy detect 224, dial access circuit 226 and line relay 230, and functions to provide audio signal information on line 234 to speaker-amplifier 232, e.g., IC type MC 34119. Audio gain is controlled by up and down cursor key 200. Also, the modem output line 236 provides transmit and receive data output through printer port 220 that is connectable to an associated printer mechanism (not shown). Data output on leads 222 and 236 via the RJ-11(c) connector assigns pin number 1 as +5 external voltage, pin numbers 2 and 5 as the RX/TX (printer data) external connections, pin number 6 as external ground, pin number 3 as "tip" and pin number 4 as "ring" connection.

The program control of the terminal 180 now offers a much expanded selection of operation/utility routines. The various routines are selectable from the Menu display, three of which may be selected at a time by pressing the Menu key 196. The nine utility routines are as follows:
  Data Access
  View Messages
  Erase Memory
  Edit Clipboard
  Edit Directory
  Print All Sessions
  Voice Access
  Terminal Config. (Configuration)
  Diagnostics The Menu screens are formatted and arranged in the order set forth above and displayed on three successive screens showing three routines each as controlled by Menu key 196.

The terminal 180 includes expanded program material as well as circuitry to expand the capability by a significant degree, and by calling up a SMART DIAL routine the technician can quickly access a subscriber line that functions either with dial pulse (DP) or by means of dual-tone multi-frequency (DTMF) signalling. The DP or rotary dial method is the oldest and lowest cost option for a subscriber; however, more recently the DTMF system has been introduced, i.e., the so-called TOUCH-TONE ® service. Most telephone companies offer both types of customer dialing and the particular switching office must install a special register to accommodate the DTMF dialing method. Also, while original planning called for phasing out the DP service, more recent economies, need for increased low cost service, and such as "Lifeline" service for the elderly and retirees, has necessitated unexpected growth and preservation of the DP service.

Individual telephone technicians are called upon to use subscriber lines at various locations for access to testing systems or administrative data systems. The technician will have no knowledge of the actual type of service, whether DP or DTMF, that is available on a particular subscriber line, and he must dial in a "trial and error" mode. That is, they may first attempt dialing in the DTMF mode, and if that is unsuccessful they then actuate a mode switch on the voice or data terminal and dial again in the DP mode. However, to again commence dialing the technician must again configure his terminal from the beginning, a time consuming operation. Terminal 180 includes hardware and program termed "SMART DIAL" which automatically determines which dialing mode is required by the particular subscriber line when the operator first connects the terminal. Thus, SMART DIAL eliminates the need for the technician to know what type of signaling is required thus simplifying and speeding up dialing of telephone numbers during the everyday work process.

Terminal 180 includes certain standard telephone switching circuitry that functions in response to the SMART DIAL program routine. Thus, terminal 180 includes a band pass filter and detector circuit for determining the presence of dial tone. The circuit is program controlled to monitor the A-C signal in the frequency range of 350 to 620 Hz until four identical samples taken at 10 millisecond intervals confirm the absence or presence of any dial tone.

A "comma" may be pre-programmed in the call number directory to cause a two second pause. This may be required for calling certain numbers, as will be described. If the technician inserts a "comma" in the dialing string stored in the terminal 180 random access memory, the auto-dialer is instructed to wait two seconds before dialing the next digit. A "comma" can be keyed by the technician in accordance with the two stroke numeric dialing code, which for punctuation is as follows:

| Punctuation | Code |
| --- | --- |
| space | 11 |
| period | 12 |
| comma | 13 |
| hyphen | 14 |
| slash | 15 |
| question mark | 16 |
| colon | 17 |
| backslash | 18 |
| plus sign | 19 |

Figure 8:
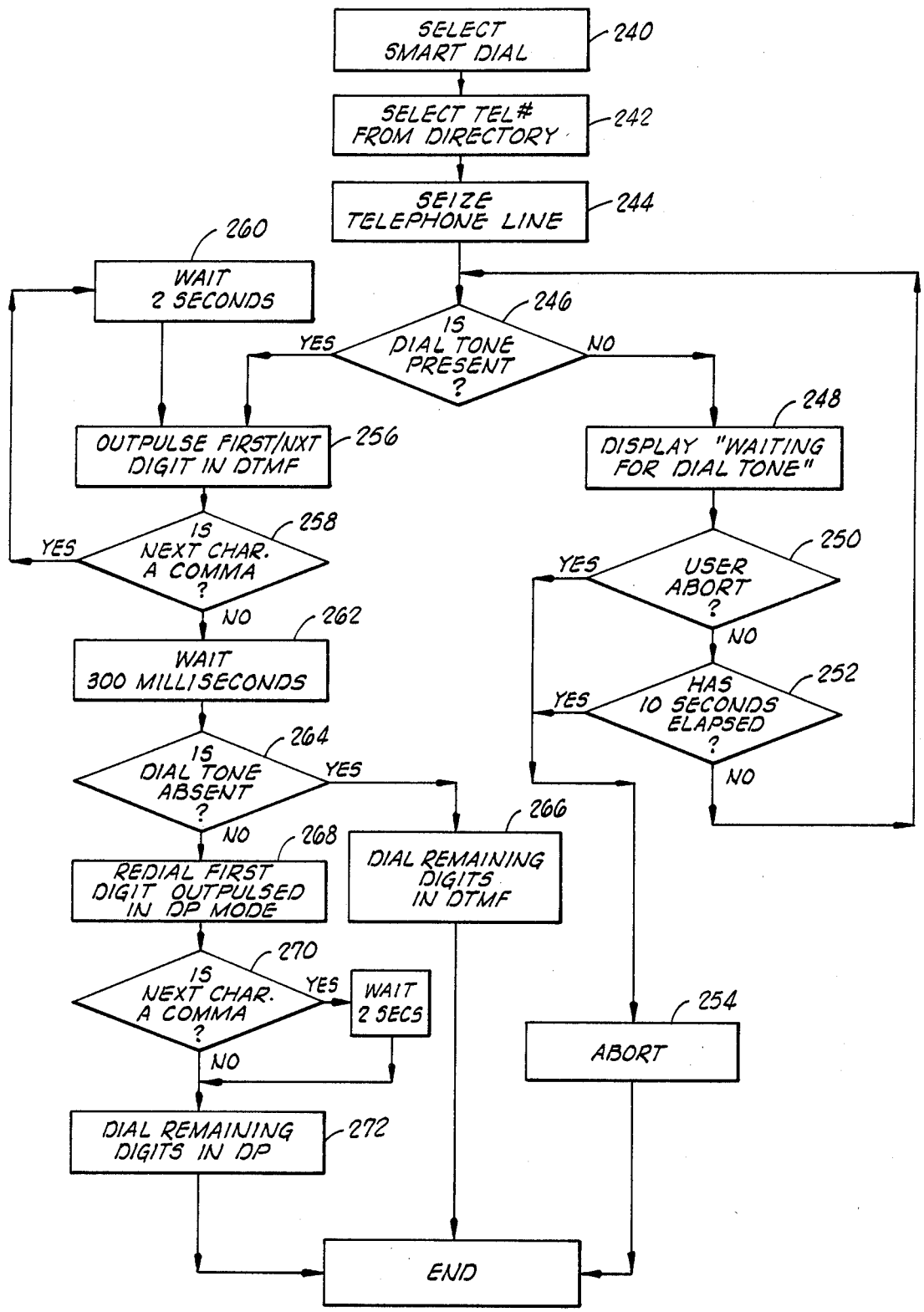
FIG. 8 is a flow diagram illustrating operation of the smart dial function that is incorporated into the improved craft terminal unit.

A flow diagram of the actual SMART DIAL program is shown in FIG. 8 and a list-out of the program is supplied with the filing of the present C-I-P patent application as exhibitory material.

Referring to FIG. 8, the SMART DIAL program is put into operation by selection at flow stage 240 and the subsequent selection of a station telephone number from the terminal directory at flow stage 242. This number will be related to the technician access network (TAN) and will be stored in a portion of the random access memory 98a of the terminal 180. SMART DIAL then seizes the telephone line as at stage 244, that is it causes the central office switching equipment to recognize the demand for service from the subscriber line. Normally, dial-tone is furnished from the central office equipment in response to the line seizure.

The program then goes to a decision stage 246 to determine whether or not dial tone is present. If NO, then function proceeds to stage 248 displaying the condition and on to a decision stage 250 to determine whether or not there has been a mistake, malfunction or error. If so, the call aborts, but if not the stage 252 sets a time limit of ten seconds which if exceeded then aborts the effort. If the ten seconds does not elapse then the program cycles back to flow stage 246 to listen for dial tone.

When a dial tone is detected, an affirmative from stage 246 commands stage 256 to outpulse a first digit in the DTMF dialing mode. Flow then proceeds to stage 258 to test for presence of a comma as the next character, and if affirmative flow proceeds to stage 260 and a two second pause whereupon it recycles through stage 256 to outpulse the next digit in DTMF. The comma code is intended to cause a two second pause to account for the possibility of having seized a subscriber PBX line or other "number plus" responsive system.

If, at decision stage 258, there was no comma, or if the comma response has been accounted for, then flow proceeds to a delay stage 262 and a wait of 300 milliseconds whereupon decision stage 264 tests for absence of dial tone. If affirmative (no dial tone), flow proceeds to stage 266 and the remaining digits are dialed in DTMF with subsequent close-out of the program SMART DIAL. If dial tone is not absent as determined by stage 264, a redial procedure commences with outpulsing of the first digit in the DP mode in stage 268. Once again, decision stage 270 tests for a pause to determine if the next character is a comma and, if affirmative, the program waits two seconds and completes dialing of remaining digits in the DP mode at stage 272. If no comma was detected and no pause is required, the function flows immediately from decision stage 270 to stage 272 to dial the remaining DP digits and close out program SMART DIAL.

In operation, the technician first connects terminal 180 to a subscriber line. The technician will have stored in the terminal directory the particular telephone number for the TAN system which he can call up for autodialing to the central TAN system; however, when the technician hooks up atop a telephone pole somewhere in the system he will not know whether or not he is connected into a DP service line, or a TOUCH TONE ® (a trademark of AT&T) DTMF service line, or a service requiring "number plus" dialing. Hence, the SMART DIAL program comes into play in order to greatly facilitate the technician's initialization of his terminal 180 in preparation to carry out the work function.

In auto dial mode, the technician may commence dialing of his selected access phone number. Upon sensing for initial presence of dial tone, the first character is outpulsed in DTMF manner and SMART DIAL serves to wait 300 milliseconds to test for dial tone absence. If the dial tone ceases, then the acceptance indicates DTMF service and the remaining characters of the number are dialed in DTMF to complete the connection. If after 300 milliseconds the dial tone is still present, then the dialing sequence begins anew in DP (rotary pulse) mode outpulsing. The program senses to make sure that the next character in the number code is not a comma, and then functions to dial the remaining characters or digits in DP mode to complete the connection. The test for commas at two points in the sequence is made in the event that the subscriber line seized is not one for a Centrex or PBX type of system, one requiring a second dial tone in its sequence.

When the technician establishes his subscriber line connection, he may then punch up the menu screen by pressing Menu key 196, and scrolling down to select a mode of operation from the menu. The technician can select any one of voice access or data access that combines features. The VOICE ACCESS routine is used to dial the voice access of the TAN system, pager services, recorded announcement machines or any equipment requiring the ability to monitor the line and outpulse in DTMF.

When either the DATA ACCESS or VOICE ACCESS routine is selected, the terminal knows that the host system must be dialed first. Therefore, terminal 180 directs the user to the DIRECTORY file to select the access number for the particular system or to manually dial a number. Normally this directory access number will be stored on the first line of the directory and it will appear on the top line of the first directory screen called up by menu selection.

The terminal 180 also has the capability of viewing the messages stored in the terminal memory RAM 98a, and the controls may function to edit clipboard or edit directory as required. There is a special area of memory in RAM 98a that is designated as "clipboard", and the clipboard may be used as a source for upload data until it is convenient to access a subscriber line for upload to a host computer system. The EDIT DIRECTORY function may be accessed by the menu process and a name may be entered by pressing the asterisk key (keypad 192) twice and entering alpha information in accordance with the alphanumeric code. By pressing the asterisk key twice once more it will shift to the numerics for entry of the telephone number and when the entry is complete the ARROW key 210 releases from function.

If for any reason a pause is required between digits, a comma may be entered as each comma represents a two second delay. The terminal 180 will also dial credit card numbers as they are stored in the directory memory, and the terminal is programmed to permit forty characters or up to two lines of text per access number.

To view messages that may be stored in the terminal 180 memory, the operator may call up on menu the VIEW MESSAGE function. The screen presentations will display the last text received or transmitted and, to view previous messages, the scroll key 200 can be used to browse through the memory. Any data stored in the VIEW MESSAGE section of the terminal 180 memory may be transferred to a serial printer. Printing capability is varied in accordance with the type of TAN access, i.e., whether voice access, data access or a hybrid access combination.

The foregoing discloses a novel terminal for use by the craft technician in the field to communicate fully with a variety of central access systems. The terminal is improved to provide a greater degree of capability and thus a wider range of access levels in dealing with the Technician's Access Network. The specification is particularly described with respect to the operating systems which utilize the Technician's Access Network (TAN) but it should be understood that equivalent types of operation may readily be performed with any number of central network reporting arrangements. The terminal can perform traditional numeric outpulsing in DTMF mode and alphanumeric data preparation and/or transmission in the DTMF and ASCII modes.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are as follows:

1. Apparatus for determining the type of customer signalling, whether dial pulse or dual tone nulti-frequency, when randomly connecting into a subscriber line of a telephone system, comprising:
    means for seizing a selected telephone subscriber line and receiving dial tone;
    means for outpulsing the first digit of a selected telephone number in dual tone multi-frequency signal;
    means for selectively sensing absence and presence of said dial tone;
    means responsive to absence of dial tone for outpulsing all remaining digits of the selected telephone number in dual tone multi-frequency signals to complete the call; and
    means responsive to presence of dial tone for outpulsing the first and all remaining digits of the selected telephone number in dial pulse signals to complete the call.

2. Apparatus as set forth in claim 1 which is further characterized to include:
    means for determining if the next successive outpulsing is a predetermined character and, if so, causing a pause before outpulsing the next digit in dual tone multi-frequency signal.

3. Apparatus as set forth in claim 1 which is further characterized to include:
    means for determining if the next outpulsing after the first digit in dual pulse signals is a predetermined character and, if so, causing a pause before outpulsing the next digit in dial pulse signals.

4. Apparatus as set forth in claim 2 which is further characterized to include:
means for determining if the next outpulsing after the first digit in dial pulse signals is a predetermined character and, if so, causing a pause before outpulsing the next digit in dial pulse signals.

5. A portable craftsman's terminal for communicating with a central access network of a telephone operating system, comprising:
means for connecting the terminal to a selected telephone subscriber line in the operating system and receiving dial tone;
means for outpulsing first and sequential digits representative of a predetermined telephone number for said central access network;
means responsive to said first digit outpulsing to determine if the subscriber line is a selected one of dial pulse service and dual tone multi-frequency service;
means for completing outpulsing of the telephone number digits in the required mode of service to establish communication with said central access network;
means for receiving downloaded ASCII coded data as transmitted from said central access network;
display means for displaying said downloaded data;
means for composing an alphanumeric data message as read out on said display means; and
means for transmitting said data message for upload to said central access network.

6. A portable terminal as set forth in claim 5 which further includes:
means for outputting data shown on said display means to an external print facility.

7. A portable terminal as set forth in claim 5 wherein said means for receiving further comprises:
microprocessor means controlled by program to coordinate operative functions of said terminal;
random access memory means for receiving in storage serially the downloaded data as well as the alphanumeric data messages for uploading; and
erasable, programmable read only memory means for storing said program for selective input to said microprocessor means.

8. A portable terminal as set forth in claim 7 wherein:
said random access memory means includes at least one telephone number for said central access network; and
means for outpulsing is an auto-dial device actuated to dial a selected telephone number from said random access memory means.

9. A method for conductively engaging a telephone subscriber line and identifying the type of operating service in order to outpulse call number signals and gain access to a receiving entity, comprising:
gaining connection to a subscriber line of a telephone operating system;
detecting initial dial tone for said operating system;
outpulsing the first digit of the call number in dual tone multi-frequency signal;
determining that dial tone ceases after outpulsing the first digit signal and outpulsing the remaining digits of the call number in dual tone multi-frequency signal; and
determining alternatively that dial tone does not cease after outpulsing said first digit of the call number in dual tone multi-frequency signal, and outpulsing the first and remaining digits of the call number in dial pulse signal.

10. A method as set forth in claim 9 which is further characterized to include the step, comprising:
determining if there is a predetermined character succeeding the first digit of the call number and, if affirmative, causing a two second pause in outpulsing of the call number signals.

11. A method as set forth in claim 9 which is further characterized to include the step of:
determining a negative as to the presence of a predetermined character succeeding the first digit and pausing 300 milliseconds before said step of determining whether said dial tone ceases.

* * * * *

UNITED STATES PATENT AND TRADEMARK OFFICE
CERTIFICATE OF CORRECTION

PATENT NO. : 4,922,516

DATED : May 1, 1990

INVENTOR(S) : Myron C. Butler, et al

It is certified that error appears in the above-identified patent and that said Letters Patent is hereby corrected as shown below:

On the title page:

Change the title to: TELEPHONE TECHNICIAN'S TERMINALS WITH AUTO-SELECTION OF DIAL PULSE OR DTMF SIGNALLING Change the Assignee to: COMMUNICATION MANUFACTURING COMPANY Signed and Sealed this Twenty-fourth Day of September, 1991

*Attest:*

HARRY F. MANBECK, JR.

*Attesting Officer*

*Commissioner of Patents and Trademarks*